(12) United States Patent
Bu et al.

(10) Patent No.: US 12,013,006 B2
(45) Date of Patent: Jun. 18, 2024

(54) LIQUID COMPOSITE SPRING

(71) Applicant: ZHUZHOU TIMES NEW MATERIAL TECHNOLOGY CO., LTD, Hunan (CN)

(72) Inventors: Jiling Bu, Hunan (CN); Yongguan Wang, Hunan (CN); Guijie Liu, Hunan (CN); Xingwu Ding, Hunan (CN); Zhangyang Xia, Hunan (CN)

(73) Assignee: ZHUZHOU TIMES NEW MATERIAL TECHNOLOGY CO., LTD, Hunan (CN)

( * ) Notice: Subject to any disclaimer, the term of this patent is extended or adjusted under 35 U.S.C. 154(b) by 0 days.

(21) Appl. No.: 18/181,838

(22) Filed: Mar. 10, 2023

(65) Prior Publication Data

US 2023/0213084 A1    Jul. 6, 2023

Related U.S. Application Data (63) Continuation of application No. 17/423,345, filed as application No. PCT/CN2020/113485 on Sep. 4, 2020, now Pat. No. 11,732,773.

(30) Foreign Application Priority Data

Sep. 6, 2019 (CN) .......................... 201910840157.8

(51) Int. Cl.
  *F16F 13/08* (2006.01)
  *F16F 13/00* (2006.01)

(52) U.S. Cl.
  CPC ...... *F16F 13/085* (2013.01); *F16F 2224/025* (2013.01); *F16F 2230/30* (2013.01)

(58) Field of Classification Search
  CPC . F16F 13/085; F16F 2224/025; F16F 2230/30
  See application file for complete search history.

(56) References Cited

U.S. PATENT DOCUMENTS

| 4,630,803 A | 12/1986 | Werner et al. |
| 11,732,773 B2 * | 8/2023 | Bu .......................... F16F 13/108 |
| | | 267/140.13 |

(Continued)

FOREIGN PATENT DOCUMENTS

| CN | 101718326 A | * 6/2010 |
| CN | 104141732 A | 11/2014 |

(Continued)

OTHER PUBLICATIONS

International Search Report and Written Opinion from PCT Application No. PCT/CN2020/113485, Dec. 9, 2020.

(Continued)

*Primary Examiner* — Melody M Burch
(74) *Attorney, Agent, or Firm* — Workman Nydegger (57) ABSTRACT

A liquid composite spring for vehicles includes: a core shaft; an outer sleeve arranged on an upper portion of the core shaft, the upper portion of the core shaft being located inside the outer sleeve while the lower portion of the core shaft being located outside the outer sleeve; an upper liquid chamber formed in an upper portion of the outer sleeve, a lower end of the upper liquid chamber being connected to a top of the core shaft; and a lower liquid chamber formed in a lower portion of outer sleeve, the lower liquid chamber and the upper liquid chamber being connected with each other through a metal-rubber main spring. At least one flow channel body is provided in the metal-rubber main spring, so that liquid in the upper liquid chamber and liquid in the lower liquid chamber are communicated with each other through the flow channel body.

5 Claims, 5 Drawing Sheets

(56) References Cited

U.S. PATENT DOCUMENTS

| | | |
|---|---|---|
| 2011/0001281 A1 | 1/2011 | Kanaya et al. |
| 2012/0205845 A1 | 8/2012 | Gedenk |
| 2015/0240905 A1* | 8/2015 | Kuzukawa ............ F16F 13/108 |
| | | 267/140.13 |

FOREIGN PATENT DOCUMENTS

| | | | | |
|---|---|---|---|---|
| CN | 102644692 B | 5/2015 | | |
| CN | 106704460 A | 5/2017 | | |
| CN | 107489728 A | 12/2017 | | |
| CN | 108411713 A | 8/2018 | | |
| CN | 109236928 A | 1/2019 | | |
| CN | 110566626 A | 12/2019 | | |
| CN | 110594342 A | 12/2019 | | |
| CN | 110630679 A | 12/2019 | | |
| CN | 211009694 U | 7/2020 | | |
| CN | 211117331 U | 7/2020 | | |
| CN | 211117333 U | 7/2020 | | |
| DE | 102016104494 A1 * | 9/2016 | ................ | B61F 5/10 |
| EP | 0262840 A2 | 9/1987 | | |
| EP | 386735 A * | 9/1990 | ........... | B60G 13/003 |
| EP | 1900965 A1 * | 3/2008 | ................ | B61F 5/00 |
| EP | 1900965 A1 | 3/2008 | | |
| GB | 2310025 A | 8/1997 | | |
| JP | 2011251684 A * | 12/2011 | | |

OTHER PUBLICATIONS

Supplementary European Search Report from corresponding EP Application No. 20860415, Sep. 14, 2022.

* cited by examiner

LIQUID COMPOSITE SPRING

TECHNICAL FIELD

The present invention relates to a liquid composite spring for vehicles, especially for rail vehicles.

TECHNICAL BACKGROUND

Complicated vibration will be generated when a rail vehicle is running on a rail, so that it is necessary to install a spring device on the rail vehicle for reducing mechanical vibrations. Use of traditional rubber cone springs can readily achieve different values of stiffness in vertical, horizontal and longitudinal directions with improved nonlinear characteristics. Therefore, such rubber cone springs can normally meet the requirements of general axle box suspension. However, due to the limitations of rubber material, the dynamic stiffness of the rubber cone spring will be reduced as the frequency of the vibration increases, so that the phenomenon of high-frequency dynamic softening will occur. At the same time, since the damping performance of the rubber material is relatively small, the capability thereof for dissipating vibration energy is limited.

SUMMARY OF THE INVENTION

In view of the above problems, the present invention proposes a liquid composite spring, which can, in addition to vibration reduction, achieve variable stiffness and enhance damping effect.

The present invention proposes a liquid composite spring, comprising: a core shaft; an outer sleeve arranged on an upper portion of the core shaft, wherein the upper portion of the core shaft is located inside the outer sleeve, while an lower portion thereof is located outside the outer sleeve; an upper liquid chamber formed in an upper portion of the outer sleeve, a lower end of the upper liquid chamber being connected to a top of the core shaft; and a lower liquid chamber formed in a lower portion of the outer sleeve, the lower liquid chamber and the upper liquid chamber being connected with each other through a metal-rubber main spring. At least one flow channel body is provided in the metal-rubber main spring, so that liquid in the upper liquid chamber and liquid in the lower liquid chamber are communicated with each other through the flow channel body.

As a further improvement of the present invention, the outer sleeve includes a cylindrical rigid outer wall, and a flexible sealing member that seals a lower end of the lower liquid chamber. An outer edge of the sealing member is connected to a bottom of the outer wall, and a middle portion thereof is connected to the core shaft.

As a further improvement of the present invention, the metal-rubber main spring includes a rubber body, a middle portion and an outside of which are connected to the core shaft and the outer wall, respectively. A metal partitioning plate is arranged inside the rubber body.

As a further improvement of the present invention, an annular flow channel body is arranged in the rubber body, and at least one flow channel is arranged in the annular flow channel body. The flow channel is configured to provide liquid communication between the upper liquid chamber and the lower liquid chamber, and generate a certain damping force during flow of the liquid.

As a further improvement of the present invention, the flow channel body is a rigid metal damping flow channel plate, and multiple flow channels are evenly arranged in the metal damping flow channel plate.

As a further improvement of the present invention, the flow channels are each a straight through hole or a spiral hole.

As a further improvement of the present invention, the flow channel body is a flexible rubber flow channel plate, in which a plurality of flow channel pipes is evenly arranged, the flow channel pipes being embedded in the rubber flow channel plate and vulcanized therewith into one piece, and each of the flow channel pipes defines a flow channel therein.

As a further improvement of the present invention is that the flow channel pipes are each a straight through hole or a spiral hole.

As a further improvement of the present invention, an outer edge of the sealing member is provided with a metal ring, and an inner side of a bottom of the outer wall is provided with a groove that cooperates with the metal ring. The metal ring is arranged in the groove, and connected to the outer wall by a bolt.

As a further improvement of the present invention, a protrusion is provided on an inner side of the sealing member, and is fixed in the core shaft.

Compared with the prior arts, the present invention has the following advantages. The liquid composite spring according to the present invention has an upper liquid chamber and a lower liquid chamber, which are connected with each other by a flow channel body. In this manner, liquid can reciprocally flow between the upper and lower liquid chambers through flowing channels, which can enhance the effect of vibration reduction, and at the same time provide variable stiffness and improved damping effect.

BRIEF DESCRIPTION OF THE DRAWINGS

In the drawings, the same components are indicated with the same reference signs, respectively. The drawings are not drawn to actual scale.

DETAILED DESCRIPTION OF THE EMBODIMENTS

The present invention will be further described below in conjunction with the accompanying drawings.

Figure 1:
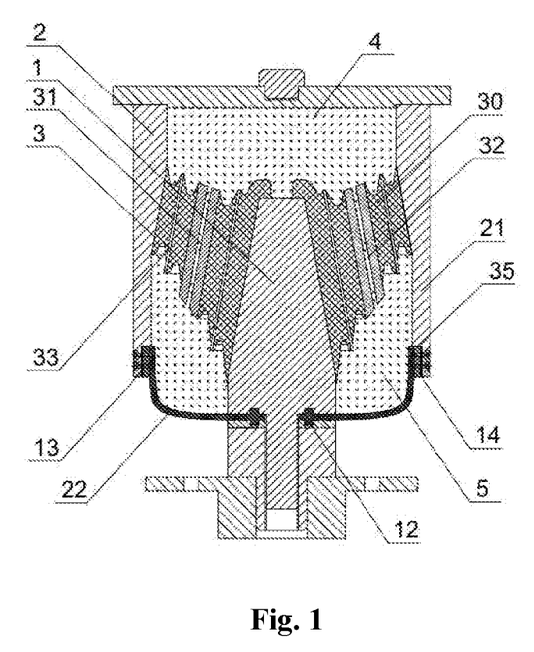
FIG. 1 schematically shows the structure of a liquid composite spring according to an embodiment of the present invention.

FIG. 1 schematically shows a liquid composite spring according to an embodiment of the present invention. In the liquid composite spring according to the present invention, liquid can reciprocally flow in upper and lower liquid chambers through flowing channels, especially under vibrations, thereby providing variable stiffness and improved damping effect.

Figure 2:
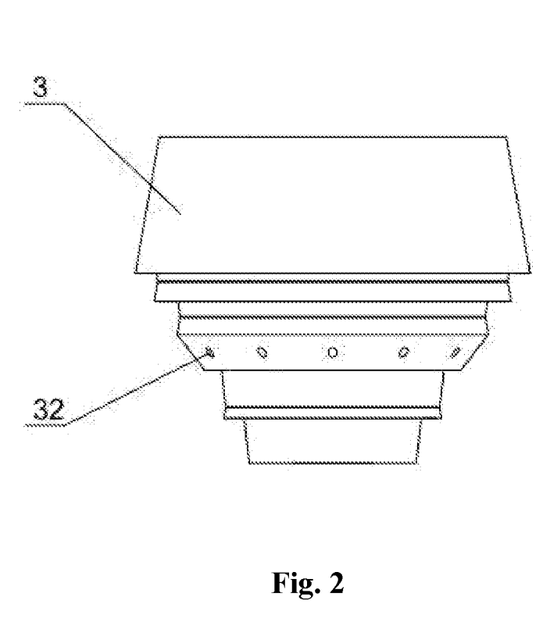
FIG. 2 is a side view schematically showing the structure of a metal-rubber main spring, without a flow channel tube, according to an embodiment of the present invention.

FIGS. 1 and 2 schematically show a liquid composite spring according to a first embodiment of the present invention. As shown in FIG. 1, the liquid composite spring includes a core shaft 1. An outer sleeve 2 is connected to an upper portion of the core shaft 1, wherein a lower portion of the outer sleeve 2 is arranged around the upper portion of the core shaft 1. The upper portion of the core shaft 1 is located inside the outer sleeve 2, while a lower portion thereof extends out of the outer sleeve 2. An upper liquid chamber 4 is formed in an upper space inside the outer sleeve 2, and a middle area of a lower portion of the upper liquid chamber 4 is connected to a top end of the core shaft 1. In addition, a lower liquid chamber 5 is formed in a lower space inside the outer sleeve 2. The lower liquid chamber 5 is spaced from the upper liquid chamber 4 with a certain space, in which a metal-rubber main spring 3, formed by combining a rubber elastic material body and a metal supporting element, is arranged. In this embodiment, at least one flow channel body 31 is provided in the metal-rubber main spring 3, so that liquid in the upper liquid chamber 4 is in communication with that in the lower liquid chamber 5 through the flow channel body 31.

In use, the liquid composite spring according to the present embodiment is arranged on a bogie of a rail vehicle. Under the vibrations generated when the vehicle is running on a rail, the core shaft 1 will move in the outer sleeve 2. With the upper liquid chamber 4 and the lower liquid chamber 5 in the liquid composite spring according to the present embodiment, liquid can be circulated therebetween through the flow channel body 31, thus changing the volume of the upper liquid chamber 4 and the lower liquid chamber 5 when the core shaft 1 moves. Therefore, during circulation of fluid, the damping effect and stiffness of the liquid composite spring are both changed.

In one embodiment, the outer sleeve 2 includes a rigid outer wall 21 and a flexible sealing member 22. The outer wall 21 has a cylindrical structure, and the sealing member 22 is arranged at a lower end of the outer wall 21, for sealing a lower end of the lower liquid chamber 5. Therefore, with the flexible sealing member 22, the lower liquid chamber 5 is formed as a flexible chamber. An outer edge of the sealing member 22 is connected to a bottom of the outer wall 21, and a middle portion thereof is connected to the core shaft 1.

In the use of the liquid composite spring according to the present embodiment, the flexible sealing member 22 is provided at the bottom of the outer sleeve 2, so that the lower liquid chamber 5 is formed as a flexible chamber. During flow of fluid, the volume of the lower liquid chamber 5 can be changed due to its deformation, so as to ensure smooth flow of the fluid. In addition, when the core shaft 1 moves, the position of the core shaft 1 relative to the outer sleeve 2 will be also changed, thereby driving the fluid to flow. In this manner, vibration dampening effect can be achieved.

In a preferred embodiment, the metal-rubber main spring 3 includes at least one rubber body 30. The rubber body 30 has a middle portion connected to the core shaft 1, an outer portion connected to the outer wall 21, an upper end connected to the upper liquid chamber 4, and a lower end connected to the lower liquid chamber 5. In this embodiment, a metal partitioning plate 33 is provided inside the rubber body 30. The partitioning plate 33 has a ring-shaped or a cone-shaped structure, and is formed with the rubber body 30 into one piece.

In one embodiment, the flow channel body 31 and the partitioning plate 33 are both used as metal inserts for being vulcanized with the rubber body 30 into one piece, thus forming the metal-rubber main spring 3. At least one flow channel 32 penetrates through the rubber body 30 to communicate with the upper liquid chamber 4 (as shown in FIG. 1). Preferably, the rubber body 30 is a flexible structure vulcanized on the upper portion of the outer wall 21, with the middle portion of the rubber body 30 being fixedly connected with the core shaft 1. In another embodiment, the rubber body 30 is arranged at the bottom of the upper liquid chamber 4, and is integrated with the partitioning plate 33 (as shown in FIG. 2).

In the liquid composite spring according to the present embodiment, the bottom of the upper liquid chamber 4 is sealed by the rubber body 30. When the core shaft 1 moves, it can drive the rubber body 30 to move also. On the one hand, the rubber body 30 per se can reduce vibration. On the other hand, the deformation of the rubber body 30 will cause the deformation of the upper liquid chamber 4, thereby driving the fluid to flow. In this manner, the stiffness and damping effect of the overall liquid composite spring can be both changed.

In one embodiment, the flow channel body 31 is arranged inside the rubber body. The flow channel body 31 is a ring-shaped structure, or more specifically, an annular cylinder or an annular cone. Multiple flow channels 32 may uniformly arranged in the flow channel body 31. The flow channels 32 are configured to circulate liquid between the upper liquid chamber 4 and the lower liquid chamber 5, and generate a certain damping force during the flow. Since the flow channels 32 can generate a certain resistance during the flow of liquid, the liquid will have a certain viscosity when flowing, thus enhancing the damping effect. In a preferred embodiment, the flow channels are each configured as a straight through hole, and uniformly arranged in the flow channel body. In another preferred embodiment, the flow channel is formed as a spiral hole, which is helically arranged inside the flow channel body. The shape of the flow channel can also be curved, arced or inclined.

In the liquid composite spring according to the present embodiment, the upper liquid chamber 4 and the lower liquid chamber 5 are communicated with each other through the flow channel 32. When the liquid composite spring of the present embodiment is subjected to a vertical load, the liquid in the lower liquid chamber 5 will flow into the upper liquid chamber 4 through the flow channel, thus providing an extra damping force. Accordingly, impact can be reduced, and the effect of vibration reduction can be improved.

Figure 3:
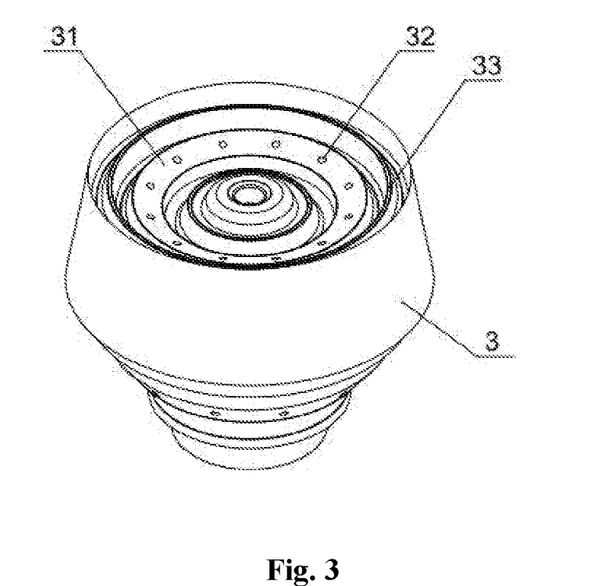
FIG. 3 is a perspective view schematically showing the structure of the metal-rubber main spring, without the flow channel tube, according to the embodiment of the present invention.
Figure 4:
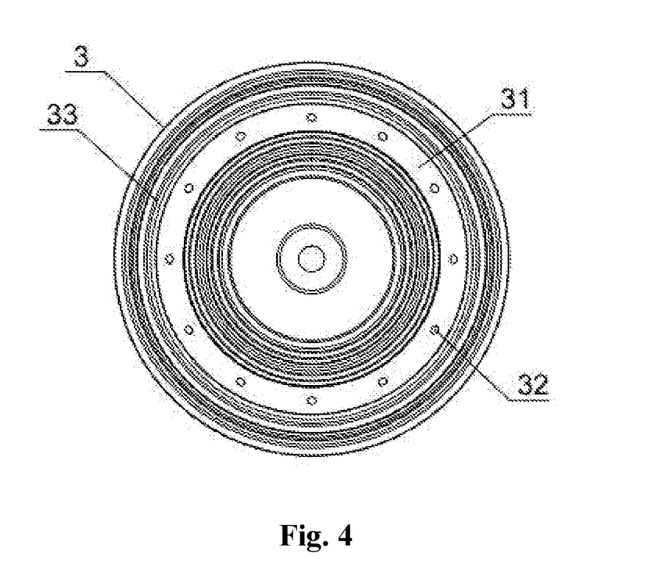
FIG. 4 is a top view schematically showing the structure of a metal-rubber main spring, without a rubber flow channel plate, according to an embodiment of the present invention.
Figure 5:
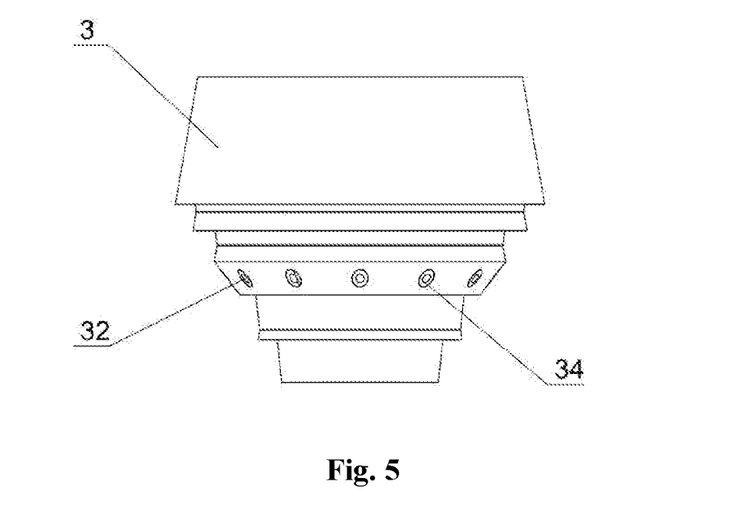
FIG. 5 is a side view schematically showing the structure of the metal-rubber main spring, with the flow channel tube, according to an embodiment of the present invention.
Figure 6:
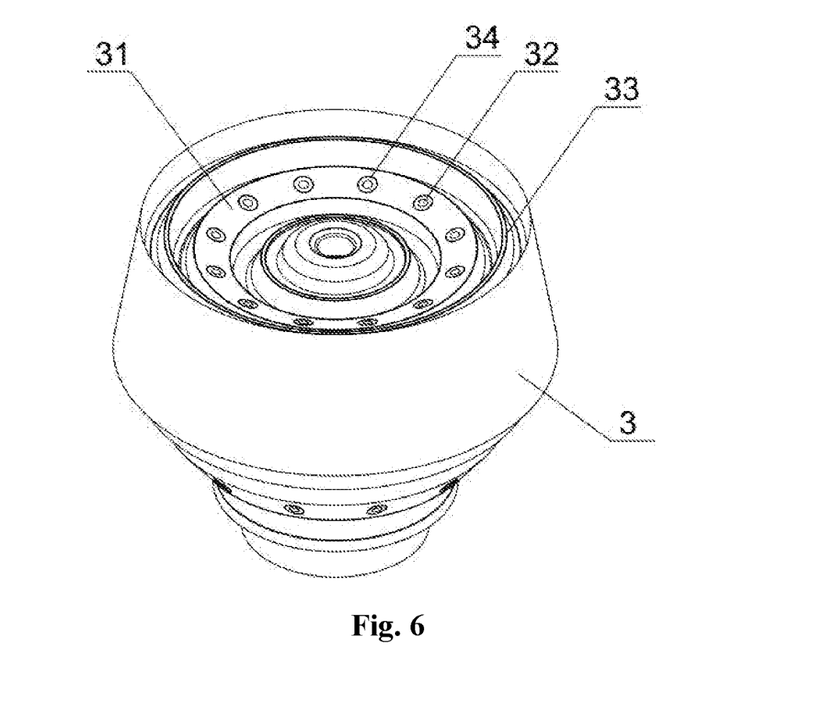
FIG. 6 is a top view schematically showing the structure of the metal-rubber main spring, with the flow channel tube, according to the embodiment of the present invention.
Figure 7:
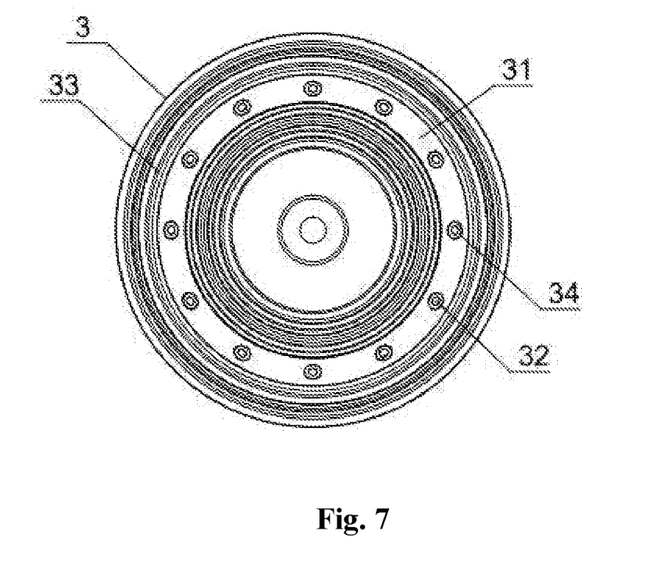
FIG. 7 is a perspective view schematically showing the structure of the metal-rubber main spring, with the flow channel tube, according to the embodiment of the present invention.

In a preferred embodiment, as shown in FIGS. 3 and 4, the flow channel body 31 is formed as a rigid metal damping flow channel plate, in which the flow channels 32 are evenly formed. In the liquid composite spring according to the present embodiment, the flow channel body 31 is a rigid member through casting or forging of metal, so that improved effect of support can be obtained through the rigid flow channel body 31. In this manner, it can ensure that the flow channel body 31 will not be deformed to block the flow channels 32 when the liquid composite spring is deformed.

In another preferred embodiment, as shown in FIGS. 4 to 7, the flow channel body 31 is formed as a flexible rubber flow channel plate, in which a plurality of flow channel pipes 34 are uniformly arranged. The flow channel pipes 34 are preferably made of rigid material, in order to prevent the flow channel tubes 34 from being blocked during the deformation of the liquid composite spring. Each of the flow channel tubes 34 defines a flow channel 32 therein. In this embodiment, the flow channel tubes 34 are embedded in the rubber flow channel plate in advance, and then vulcanized with the rubber flow channel plate into one piece.

In the liquid composite spring according to this embodiment, the flow channel body 31 is formed as a flexible rubber flow channel plate. Since the rubber flow channel plate has excellent elasticity, the overall elasticity of the liquid composite spring is enhanced. In addition, the provision of the flow channel tube 34 can further prevent the flow of liquid in the flow channel holes 32 from being affected by the flow channel body 31 when it is deformed.

In an embodiment, the partitioning plate 33 has a shape similar to the flow channel body 31, and preferably has a structure of an annular cylinder or an annular cone. The partitioning plate 33 functions as a support, and a gap formed between an outer ring and an inner ring of the partitioning plate 33 is filled with the rubber body 30. Alternatively, the partitioning plate 33 is nested inside the rubber body 30, and has its lower end connected to the upper end of the lower liquid chamber 5. The cross section of the partitioning plate is annular. The cross-sectional width of the outer ring of the partitioning plate is different from that of the inner ring of the partitioning plate, wherein the outer ring of the partitioning plate has a relatively larger width while the inner ring thereof has a relatively smaller width, with a certain distance separated therebetween to form an annular structure. In addition, the inner ring of the partitioning plate 33 is located inside an inner ring of the flow channel body 31, but the outer ring of the partitioning plate 33 is located outside an outer ring of the flow channel body 31.

Preferably, in this embodiment, the inner ring of the partitioning plate 30 is relatively long, while the outer ring of the partitioning plate is relatively short. The upper ends of both rings of the partitioning plate 30 are connected to the upper liquid chamber 4, so that their heights are relatively close to each other. The upper portion of the lower liquid chamber 5 is formed as having a stepped structure, with an inner side of the step being lower. In this way, when the core shaft 1 moves up and down, the rubber body 30 and the sealing member 22 are driven to deform, thereby causing the partitioning plate 30 to move up and down.

In one embodiment, the flow channel tube 34 is configured as a through hole or a spiral hole, and is arranged between the upper liquid chamber 4 and the lower liquid chamber 5. The flow channel 32 may be a straight-through structure as a whole, or an inclined structure, a curved structure, or a spiral cylinder shape. However, all the structures capable of realizing damping communication are within the scope of protection of the present invention. Through providing the flow channel with a spiral structure, the flow path thereof can be increased, thereby enhancing the damping and vibration reducing effect.

In one embodiment, a metal ring 35 is provided on the outer edge of the sealing member 22, and a groove 13 corresponding to the metal ring 35 is provided on an inner side of the bottom of the outer wall 21. The groove 13 is annular, in which the metal ring 35 can be received. The metal ring 35 and the sealing member 22 may be both connected to the outer wall 21 by respective bolts. Preferably, a rubber pad 14 is further provided between the metal ring 35 and the groove 13.

In the liquid composite spring according to the present embodiment, the metal ring 35 is provided on the outer edge of the sealing member 22. Since the sealing member 22 is made of a flexible material, it can be more firmly connected to the outer wall 21 via the metal ring 35. The outer wall 21 is provided with the groove 13 for restricting the metal ring 35, so that mounting the metal ring in the groove and removing the metal ring from the groove through bolts are both facilitated. Moreover, the sealing performance of the lower liquid chamber 5 as a whole can be enhanced by the rubber pad 14.

In an embodiment, an inner end of the sealing member 22 is provided with a protrusion, which extends in and fixed to the core shaft 1. In this embodiment, the core shaft 1 is provided with a step structure, which has a groove corresponding to the protrusion. Therefore, the protrusion can be clamped in the groove. A metal gasket 12 is provided under the step structure. The metal gasket 12 is provided at the other end of the protrusion, for fixing the protrusion in position.

In the liquid composite spring according to the present embodiment, the sealing member 22 can be clamped inside the core shaft 1 through the protrusion, so that the sealing member 22 is firmly connected to the core shaft 1. In this manner, the sealing performance is enhanced.

Although the present invention has been described in detail with reference to preferred embodiments, various improvements can be made to the present invention and components can be replaced with equivalent counterparts without deviating the scope of the present invention. In particular, as long as no structural conflict exists, various technical features as mentioned in different embodiments can be combined in any arbitrary manner. The present invention is not limited to the specific embodiments disclosed herein, but contains all the technical solutions falling within the scope of the claims.

The invention claimed is:

1. A liquid composite spring, comprising:
   a core shaft;
   an outer sleeve arranged on an upper portion of the core shaft, wherein the upper portion of the core shaft is located inside the outer sleeve, while a lower portion thereof is located outside the outer sleeve;
   an upper liquid chamber formed in an upper portion of the outer sleeve, a lower end of the upper liquid chamber being connected to a top of the core shaft; and
   a lower liquid chamber formed in a lower portion of the outer sleeve, the lower liquid chamber and the upper liquid chamber being connected with each other through a metal-rubber main spring,
   wherein at least one flow channel body is provided in the metal-rubber main spring, so that liquid in the upper liquid chamber and liquid in the lower liquid chamber are communicated with each other only through the at least one flow channel body,
   the metal-rubber main spring includes a rubber body, a middle portion and an outside of which are connected to the core shaft and the outer sleeve, respectively,
   the at least one flow channel body is an annular flow channel body arranged in the rubber body, and at least one flow channel is arranged in the annular flow channel body, wherein the at least one flow channel is configured to provide liquid communication between the upper liquid chamber and the lower liquid chamber, and generate a certain damping force during flow of the liquid, and
   the at least one flow channel body is a flexible rubber flow channel plate, in which a plurality of flow channel pipes is evenly arranged, wherein the plurality of flow channel pipes is embedded in the rubber flow channel plate and vulcanized therewith into one piece, each flow channel pipe having a spiral shape, and each of the plurality of flow channel pipes defines a respective one of said at least one flow channel therein.

2. The liquid composite spring according to claim 1, wherein the outer sleeve includes a cylindrical rigid outer wall, and a flexible sealing member that seals a lower end of the lower liquid chamber, and wherein an outer edge of the sealing member is connected to a bottom of the cylindrical rigid outer wall, and a middle portion thereof is connected to the core shaft.

3. The liquid composite spring according to claim 2, wherein a metal partitioning plate is arranged inside the rubber body of the metal-rubber main spring.

4. The liquid composite spring according to claim 2, wherein an outer edge of the sealing member is provided with a metal ring, and an inner side of the bottom of the cylindrical rigid outer wall is provided with a groove that cooperates with the metal ring, and wherein the metal ring is arranged in the groove, and connected to the cylindrical rigid outer wall by a bolt.

5. The liquid composite spring according to claim 4, wherein a protrusion is provided on an inner side of the sealing member, and is fixed in the core shaft.

* * * * *